June 11, 1968     F. H. LITTLE     3,387,686
WHEEL CHOCK
Filed Dec. 12, 1966     2 Sheets-Sheet 1
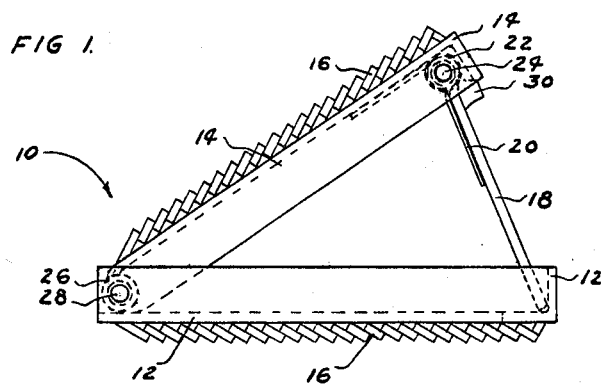
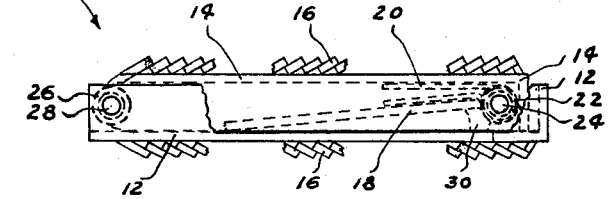
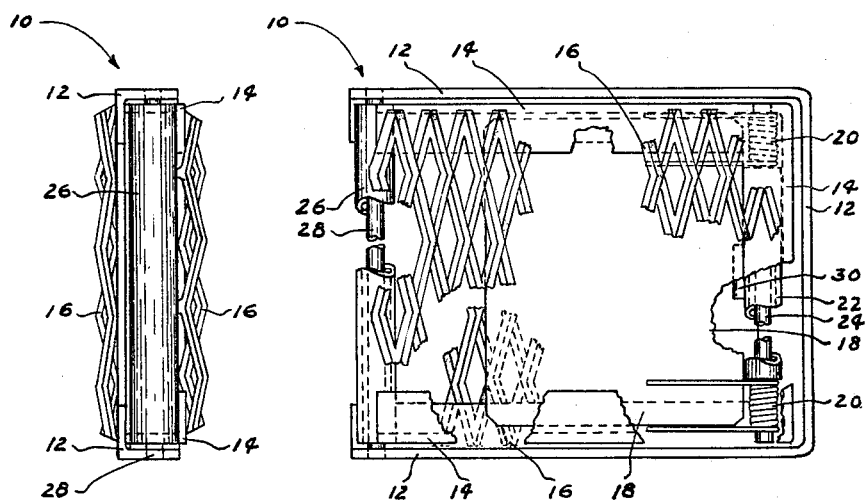
INVENTOR
FRANK H. LITTLE June 11, 1968  F. H. LITTLE  3,387,686
WHEEL CHOCK Filed Dec. 12, 1966  2 Sheets-Sheet 2

INVENTOR
FRANK H. LITTLE

United States Patent Office 3,387,686
Patented June 11, 1968

3,387,686
WHEEL CHOCK
Frank H. Little, San Joaquin County, Calif.
(1646 W. Sonoma, Stockton, Calif. 95204)
Filed Dec. 12, 1966, Ser. No. 601,227
5 Claims. (Cl. 188—32)

ABSTRACT OF THE DISCLOSURE

A collapsible wheel chock comprised of a base frame and an upper frame hinged together at one end for movement of the upper frame from a position nested in the base frame to an upwardly inclined working position; there being a support plate disposed between the frames when nested and arranged to automatically assume a stand position therebetween when the upper frame is moved to said inclined working position, and raised expanded metal providing a non-skid bottom sheet on the base frame and a non-skid top sheet on the upper frame.

This invention relates to wheel chocks for use in connection with wheels of vehicles, trailers and aircraft and more particularly, to a non-skid, collapsible device adapted for engagement with wheels so as to prevent vehicles and aircraft against movement.

It is an object of the present invention to provide a wheel chock which will maintain friction contact with both the ground and wheel tire surfaces at all times to prevent slipping, and which may be collapsed into a compact compass when not in use, and that spring pressure incorporated in the design automatically shifts the support plate into stand position when the chock is manually opened for use. It is also an object of the invention to provide a carrier for the wheel chock.

Another object of the invention is to provide wheel chocks which can be manufactured in size and strength to be utilized in conjunction with any size wheel including the smallest vehicles to large trucks, all trailers, wheeled tractors and aircraft, and can be conveniently utilized wherever needed.

Still further objects and features of this invention are to provide wheel chocks that are strong and durable, simple in construction and manufacture which can be produced and sold at a comparatively low cost.

Still additional objects, benefits, and advantages of this invention will become evident from a study of the following detailed description taken in conjuction with the accompanying drawings, in which:

FIGURE 1 is a side elevation view of a wheel chock made in accordance with the present invention shown in operative position.

FIGURE 2 is another side view of the wheel chock shown in collapsed position for storing.

FIGURE 3 is end and top plan views of the wheel chock.

Figure 4:
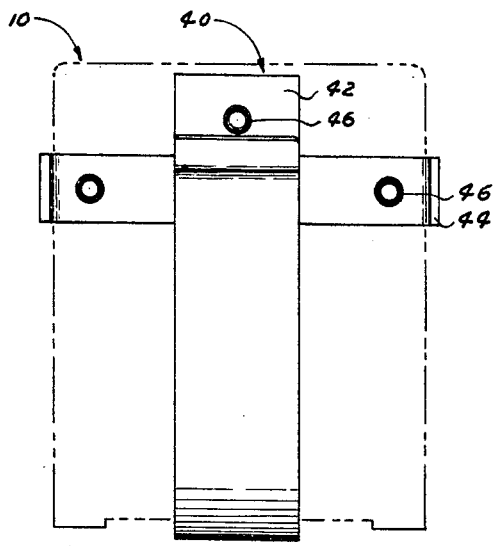
FIGURE 4 is elevated view of a wheel chock carrier.

Referring now specifically to the accompanying drawings where like reference numbers designate similar parts throughout the various views shown in FIGURES 1 through 6, it will be seen that there is a wheel chock 10 and a wheel chock carrier 40. The wheel chock 10 includes a base frame 12 and upper frame 14 formed of angle material. The base frame 12 and upper frame 14 are provided with raised expanded metal 16 which bites into the supporting ground surface and the wheel tire surface thus provide frictional engagement to both. The upper frame 14 is hingedly secured to the base frame by means of a tube 26 and shaft 28. There is free clearance between tube 26 and shaft 28 resulting in load pressure point engagement only at base frame 12 and ends of hinge tube 26 when the wheel chock is in operative position, thus no load pressure is applied to shaft 28. The support plate 18 is hingedly secured to the upper frame 14 by means of a tube 22 and shaft 24. Included are two springs 20 which shift the support plate into stand position FIGURE 1 when the upper frame 14 is manually opened into operating position. Like the base frame hinge tube 26 and shaft 28, there is free clearance between the support plate hinge tube 22 and shaft 24 resulting in load pressure engagement only at frame 14 and tube 22 when the wheel chock is in operative position. A support plate stop 30 is provided to prevent the support plate from passing beyond its bearing point at base frame 12 when the support plate moves into stand position.

In use, the wheel chock 10 may be erected from the collapsed position as is shown in FIGURE 2 to the operative position as is shown in FIGURE 1 by lifting the upper frame 14 so that the support plate 18 will rotate into stand position by the effect of springs 20. Position the chock 10 adjacent to the wheel tire FIGURE 6 to prevent the rolling backward or forward, depending upon the position of the vehicle. The wheel chock 10 is designed so that either the base frame 12 or the so called upper frame 14 may be positioned on the ground surface with identical non-skid effects.

Figure 5:
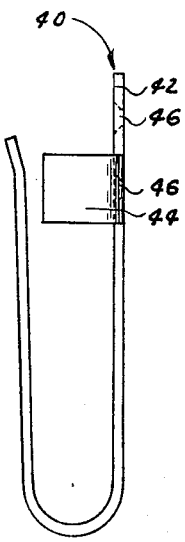
FIGURE 5 is side view of the wheel chock carrier shown in FIGURE 4.
Figure 6:
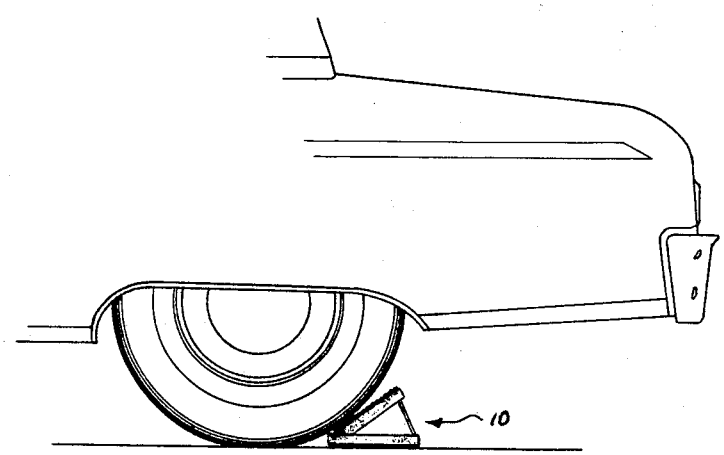
FIGURE 6 is side elevation view illustrating the wheel chock in actual use position.

Referring now to the wheel chock carrier 40 FIGURES 4 and 5. The carrier is formed of metal and is a convenient means for carrying wheel chocks inside or outside of vehicles, and aircraft. It is particularly adapted for mounting on outside areas of trucks and trailers. Mounting bolt holes 46 are provided for flat head securing bolts.

While this invention has been described with particular reference to the construction shown in the drawings and while various changes may be made in the detail construction, it shall be understood that such changes shall be within the spirit and scope of the present invention as defined by the appended claims.

Having thus completed and fully described the invention, what is now claimed as new and desired to be protected by Letters Patent of the United States is:

1. A collapsible wheel chock comprising a base frame, an upper frame, both frames being of open form, said frames being shaped and dimensioned so that the upper frame nests in the base frame when the chock is collapsed, one transverse axis hinge securing the upper frame at one end in connection with the corresponding end of the base frame, the upper frame being movable about said hinge axis from nested position to an upwardly inclined position, a support plate disposed between the base frame and upper frame when the same are nested, another transverse axis hinge securing the support plate at the related end to the other end of the upper frame, spring means between the upper frame and the support plate operative to swing the latter about said other hinge axis to a stand position in lower end engagement with the base plate upon said upper frame being moved to its inclined working position, a sheet of raised expanded metal secured to and extending below the bottom of the base frame for biting engagement with the ground surface when the chock is in use, and a sheet of raised expanded metal secured to and extending above the top of the upper frame for biting engagement with a wheel tire when the upper frame is in inclined working position and the chock is in use.

2. A wheel chock, as in claim 1, in which said one transverse axis hinge includes a cross shaft mounted in the base frame and spanning between the sides thereof, and a substantially full width tube surounding and rotatable on such cross shaft; said one end of the upper frame being fixed on the tube.

3. A wheel chock, as in claim 1, in which said other transverse axis hinge includes a cross shaft mounted in the upper frame and spanning between the sides thereof, and a tube surrounding and rotatable on such cross shaft; said related end of the support plate being fixed on the tube.

4. A wheel chock, as in claim 3, in which the spring means between the upper frame and the support plate comprises a spring having a wound portion about the cross shaft beyond an end of the tube, and opposed end portions engaged with said upper frame and support plate, respectively.

5. A wheel chock, as in claim 1, in which the sheets of raised expanded metal are disposed on the respective frames in a position to present a multiplicity of relatively differently angled, gripping edges facing away from the end of the wheel chock corresponding to said one end of the upper frame.

References Cited
UNITED STATES PATENTS

| | | | |
|---|---|---|---|
| 1,523,117 | 1/1925 | Green | 16—189 |
| 2,666,502 | 1/1954 | Fee | 188—32 |
| 2,732,035 | 1/1956 | Besoyan | 188—32 X |

FOREIGN PATENTS

| | | |
|---|---|---|
| 286,002 | 2/1928 | Great Britain. |

MILTON BUCHLER, *Primary Examiner.*

FERGUS S. MIDDLETON, *Examiner.*

T. W. BUCKMAN, *Assistant Examiner.*